United States Patent [19]

Hanada et al.

[11] Patent Number: 4,779,659
[45] Date of Patent: Oct. 25, 1988

[54] RADIAL TIRE FOR PASSENGER CARS WITH SANDWICHED UPPER BEAD FILLER

[75] Inventors: Ryoji Hanada; Sadakazu Takei, both of Hiratsuka, Japan

[73] Assignee: The Yokohama Rubber Co., Ltd., Tokyo, Japan

[21] Appl. No.: 43,390

[22] Filed: Apr. 28, 1987

[30] Foreign Application Priority Data

May 28, 1986 [JP] Japan ................................ 61-121286

[51] Int. Cl.$^4$ .............................................. B60C 15/06
[52] U.S. Cl. ................................ 152/541; 152/543; 152/555
[58] Field of Search ............... 152/539, 541, 542, 543, 152/546, 547, 555

[56] References Cited

U.S. PATENT DOCUMENTS

| | | | |
|---|---|---|---|
| 3,612,138 | 10/1971 | Ravenhall | 152/543 |
| 3,853,163 | 12/1974 | Mezzanotte et al. | 152/555 X |
| 4,100,955 | 7/1978 | Pottinger et al. | 152/541 |
| 4,139,040 | 2/1979 | Samoto et al. | 152/541 |
| 4,202,393 | 5/1980 | Ikeda et al. | 152/546 X |

FOREIGN PATENT DOCUMENTS

| | | | |
|---|---|---|---|
| 3522332 | 1/1987 | Fed. Rep. of Germany | 152/539 |
| 2102354 | 2/1983 | United Kingdom | 152/554 |

*Primary Examiner*—Michael W. Ball
*Assistant Examiner*—Geoffrey L. Knable
*Attorney, Agent, or Firm*—Armstrong, Nikaido, Marmelstein & Kubovcik

[57] ABSTRACT

A radial tire for passenger cars comprising a turnup portion of a carcass layer provided along the body of the carcass layer at a bead portion which has not been folded back and an upper bead filler provided outside the turnup portion, wherein the upper bead filler has a textile cord layer on both of its inside and outside, thereby holding the upper bead filler between the textile cord layers.

4 Claims, 5 Drawing Sheets

RADIAL TIRE FOR PASSENGER CARS WITH SANDWICHED UPPER BEAD FILLER

BACKGROUND OF THE INVENTION

This invention relates to a radial tire for passenger cars, which has an improved driving stability without sacrificing the riding comfort.

Radial tires for passenger cars generally have a carcass layer made of an organic fiber such as nylon, polyester, rayon or aromatic polyamide and a belt layer comprising steel cords crossing one another. By virtue of the insertion of steel cords, radial tires have improved wear resistance, high speed performance and driving stability over conventional bias tires as well as rolling resistance smaller than that of the conventional bias tires.

In general, a typical structure of the bead portion of radial tires includes (1) one wherein a bead filler having a high hardness is interposed between the body of the carcass layer and the turnup portion of the carcass layer in order to attain lateral stiffness through the "sandwich effect"; and (2) one wherein the turnup portion of the carcass layer is provided along the body of the carcass layer and an upper bead filler having a Shore hardness over 90 is provided outside the turnup portion, thereby improving the riding comfort without spoiling the driving stability, as described in Japanese Utility Model Publication No. 963/1984.

In the structure of the bead portion of type (1), a bead filler having a high hardness is interposed between the body of the carcass layer having an enhanced apparent stiffness due to the internal pressure and the turnup portion. This greatly enhances the bending stiffness, which in turn enhances the lateral stiffness of the tire associated with an improvement in the driving stability. However, this also unfavorably enhances the longitudinal stiffness of the tire associated with the riding comfort. As described in Japanese Patent Laid-Open No. 11443/1984, the insertion of a chafer into the bead portion improves the lateral stiffness. However, this additionally reinforces the portion between the body of the carcass layer having improved apparent stiffness by virtue of initial tension due to internal pressure and the turnup portion, which leads to lowering in the riding comfort.

In the structure of the bead portion of type (2), the lateral stiffness of the tire is attained through the compression stiffness of the upper bead filler without utilization of the "sandwich effect" between the body of the carcass layer and the turnup portion. Therefore, the longitudinal stiffness in this structure is lower than that of the structure of the bead portion of type (1), which makes it possible to improve the riding comfort. However, since the lateral stiffness of the tire inevitably lowers, a significant lack of the lateral stiffness is observed when the tires are mounted on a high performance passenger car. Therefore, such a structure of the bead portion is unsatisfactory in the driving stability.

SUMMARY OF THE INVENTION

In view of the above-mentioned situation, an object of the present invention is to provide a radial tire for passenger cars, which has an improved driving stability without sacrificing the riding comfort.

According to the present invention, there is provided a radial tire for passenger cars having a bead portion in which the end portion of the carcass layer is folded back about a bead wire from the inside of the tire towards the outside of the tire, characterized in that the turnup portion of said carcass layer is provided along the body of said bead portion which has not been folded back and that an upper bead filler having a JIS hardness of 75 to 95 is provided outside said turnup portion, said upper bead filler having, on both of its inside and outside, a textile cord layer having a cord angle of 45° or less to the circumferential direction of the tire, thereby holding said upper bead filler between said textile cord layers.

The foregoing and other objects will be apparent from the following detailed description.

DETAILED DESCRIPTION OF THE PREFERRED EMBODIMENT

Figure 1:
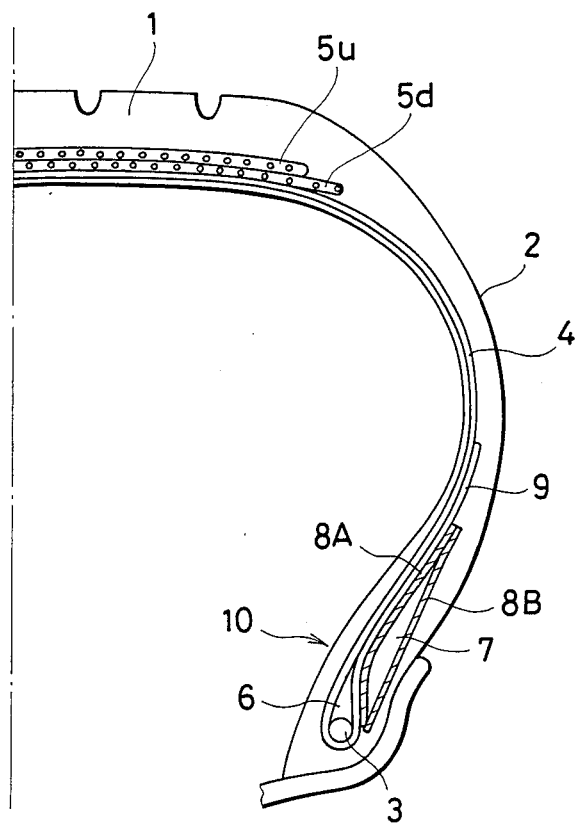
FIG. 1 is a meridian half cross-sectional view of one form of the radial tire for passenger cars according to the present invention.

In FIG. 1, a carcass layer 4 having a cord angle of 70° to 90° to the circumferential direction of the tire is mounted between a pair of right and left bead portions 10, 10. Further, a belt layer having a two-layer structure comprising an upper belt layer 5$u$ and lower belt layer 5$d$ is circularly provided on the carcss layer 4 in the tread 1. In the bead portion 10, a bead wire 3 is circularly provided, and the end portion of the carcass layer 4 is folded back around the bead wire 3 from the inside of the tire towards the outside of the tire, thereby forming a turnup portion 9. Numeral 2 designates a side wall portion.

The carcass layer 4 is provided in the form of at least one layer. An organic fiber such as nylon, polyester, rayon or aromatic polyamide is used as the cord constituting the carcass layer.

Although a steel cord is generally used as the cord constituting the belt layer, an aromatic polyamide fiber cord etc. may also be used.

In order to improve the high speed durability, a belt covering layer (not shown) may be provided on the belt layer. A nylon cord is generally used as the cord of the belt cover layer. The angle of the cord to the circumferential direction of the tire is 0° (i.e., the cord is parallel to that direction).

(1) In the present invention, the turnup portion 9 of the carcass layer 4 is provided along the body of the carcass layer, which has not been folded back, in the bead portion 10. Numeral 6 designates a lower bead filler.

This improves the lateral stiffness of the tire as well as the vertical stiffness of the tire, which prevents the lowering of the riding comfort.

(2) Further, in the present invention, an upper bead filler 7 having a JIS hardness of 75 to 95 is provided outside the turnup portion 9.

Mere provision of the turnup portion 9 along the body of the carcass layer is insufficient to ensure the lateral stiffness of the bead portion required for attaining good driving stability. Therefore, the upper bead filler 7 is provided outside the turnup portion 9 in order to prevent the increase in the vertical stiffness.

When the JIS hardness of the upper bead filler 7 is less than 75, the lateral stiffness of the bead portion cannot be sufficiently attained. On the other hand, a JIS hardness exceeding 95 brings about not only lowering in productivity due to lowering in processability, but also lowering in durability of the bead portion due to the lowering in breaking load.

(3) Further, in the present invention, textile cord layers, i.e., an inside chafer 8A and outside chafer 8B, each having a cord angle of 45° relative to the circumferential direction of the tire are provided inside and outside the upper bead filler 7, respectively, so that the upper bead filler 7 is held between the inside chafer 8A and the outside chafer 8B which, as shown in FIG. 1, contact each other at their corresponding radially inner and outer end portions.

In order to improve the driving stability through minimization of the increase in the vertical stiffness and, at the same time, to increase the lateral stiffness, the upper bead filler 7 is held between two textile chafers, thereby increasing the lateral stiffness through the sandwich effect with respect to the upper bead filler 7. In radial tires, the carcass cord is provided at 90° to the circumferential direction of the tire. Therefore, when a bead filler is inserted between the body of the carcass layer and the turnup portion 9, the direction in which the bead portion is subjected to deformation under bending is positively reinforced. For this reason, the vertical stiffness and the lateral stiffness can be increased only at the same percentage. On the other hand, the method in which the bead filler 7 is reinforced with two textile cord layers, specifically and inside chafer 8A and an outside chafer 8B enables the lateral stiffness to be increased while scarcely increasing the vertical stiffness by specifying the cord angle. That is, in the case of the vertical stiffness, the main effect resides in bending in the radial direction of the bead portion, while in the case of the lateral stiffness the main effect resides in bending in the radial direction as well as in the circumferential direction. Therefore, in order to enhance the bending stiffness in the circumferential direction rather than the bending stiffness in the radial direction, it is necessary that the cord angle be 45° or less to the circumferential direction. Further, the insertion of the cord substantially in the circumferential direction enhances only the bending stiffness of the circumferential direction and does not bring about any increase in the vertical stiffness. However, the bending in the circumferential direction brings about a greater contribution to the lateral stiffness, which causes no significant increase in the lateral stiffness. As is apparent from the foregoing description, the cord angle required for enhancement of the lateral stiffness with the vertical stiffness suppressed is 45°, preferably 10° to 40°, to the circumferential direction of the tire. The term "cord angle" as used herein is intended to mean an angle which is determined at the bottom end of the chafers (textile cord layers). Each of the inside chafer 8A and the outside chafer 8B may be formed of multiple adherent layers, such as a two-layer structure.

Examples of the cord constituting the textile cord layer include nylon, polyester, rayon, and aromatic polyamide fiber.

The present invention will now be described in more detail with reference to the following example.

EXAMPLE

Determination of the vertical and lateral spring constants and the cleat impact force (evaluation of the riding comfort) and feeling test on the driving stability through actual mounting on a passenger car were made with respect to Tires 1 to 2 according to the present invention and Comparative Tires 1 to 5.

Figure 2:
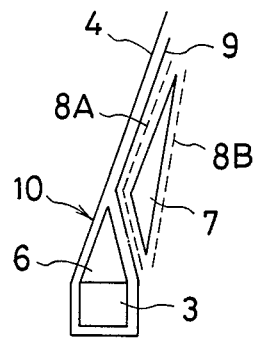
FIGS. 2(A) to (F) are illustrative views of examples of the bead portion of various tires.
Figure 2:
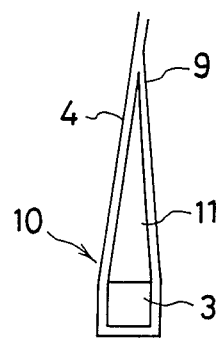
Figure 2:
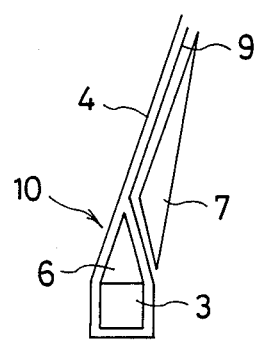
Figure 2:
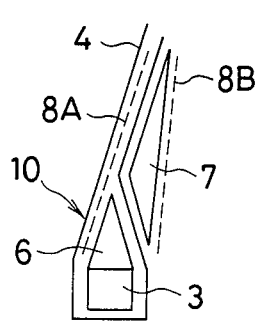
Figure 2:
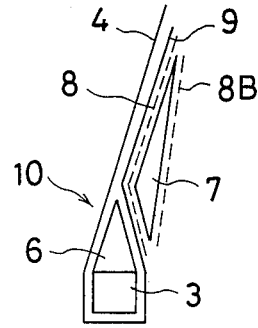
Figure 2:
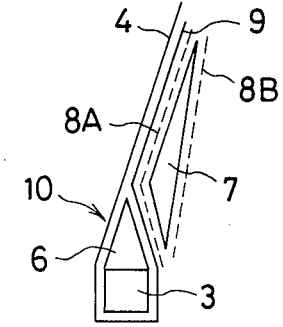

(a) Present Tire 1 according to the present invention:

Tire 1 has a size of 195/60 R14 and a bead structure as shown in FIG. 2(A). In FIG. 2(A), the bead portion 10 has a turnup portion 9 of a carcass layer 4 provided along the body of the carcass layer. An upper bead filler 7 is provided outside the turnup portion 9. The upper bead filler 7 is held between an inside chafer 8A and an outside chafer 8B. In the carcass layer 4, a polyester cord 1500 D/2 is arranged at substantially 90° to the circumferential direction of the tire. A belt layer has a two-layer structure such that steel cords 1×5 (0.25) cross each other at 20°. The lower bead filler 6 and the upper bead filler 7 are made of a very hard rubber having a JIS hardness of 90. Both of the inside and outside chafers were provided by inserting an aromatic polyamide fiber cord 1000 D/2 into a rubber having a 100% modulus of 45 kg/cm$^2$ in an amount of 40 cords per 5 cm so that the cords cross the circumferential direction of the tire at 20°.

(2) Present Tire 2 according to the present invention;

Tire 2 has the same structure as Tire 1 except that an aromatic polyamide fiber cord 1500 D/2 is arranged in a rubber composition having a 100% modulus of 45 kg/cm$^2$ in an amount of 48 cords per 5 cm so that the cords cross the circumferential direction at substantially 90°.

(c) Comparative Tire 1:

Comparative Tire 1 has a tire size of 195/60 R14 and a bead structure as shown in FIG. 2(B). As can be seen FIG. 2(B), in the bead portion 10, a bead filler 11 having a hardness of a JIS hardness of 90 is inserted between the carcass layer 4 and the turnup portion 9. The belt layer and carcass layer are the same as those of Tire 1 according to the present invention as described in the above item (a).

(d) Comparative Tire 2:

Comparative Tire 2 has a tire size of 195/60 R14 and a bead structure as shown in FIG. 2(C). Comparative Tire 2 has the same structure as that of Tire 1 according to the present invention as described in the above item (a) except that neither inside chafer 8A nor outside chafer 8B is provided.

(e) Comparative Tire 3:

Comparative Tire 3 has a tire size of 195/60 R14 and a bead structure as shown in FIG. 2(D). Comparative Tire 3 has the same structure as that of Tire 1 according to the present invention as described in the above item (a) except that the inside chafer 8A was interposed between the turnup portion 9 of the carcass layer 4 and the body of the carcass layer.

(f) Comparative Tire 4:

Comparative Tire 4 has a tire size of 195/60 R14 and a bead structure as shown in FIG. 2(E). Comparative Tire 4 has the same structure as that of Tire 1 according to the present invention as described in the above item (a) except that a rubber having a JIS hardness of 70 was used as the upper bead filler 7.

(g) Comparative Tire 5:

Comparative Tire 5 has a tire size of 195/60 R14 and a bead structure as shown in FIG. 2(F). Comparative Tire 5 has the same structure as that of Tire 1 according to the present invention as described in the above item (a) except that the cord angle of the chafer was 50°.

DETERMINATION OF VERTICAL AND LATERAL SPRING CONSTANTS

Rim: 6JJ×14
Inflation pressure: 2.0 kg/cm$^2$
Load: 350 kg

The vertical spring constant was expressed in terms of a ratio of the vertical load in the range of 350 kg±50 kg to the value of the vertical displacement. The lateral spring constant was determined by applying a normal load of 350 kg and then applying a lateral displacement and determining the ratio of the lateral force to the lateral displacement between 5 mm and 15 mm.

Figure 3:
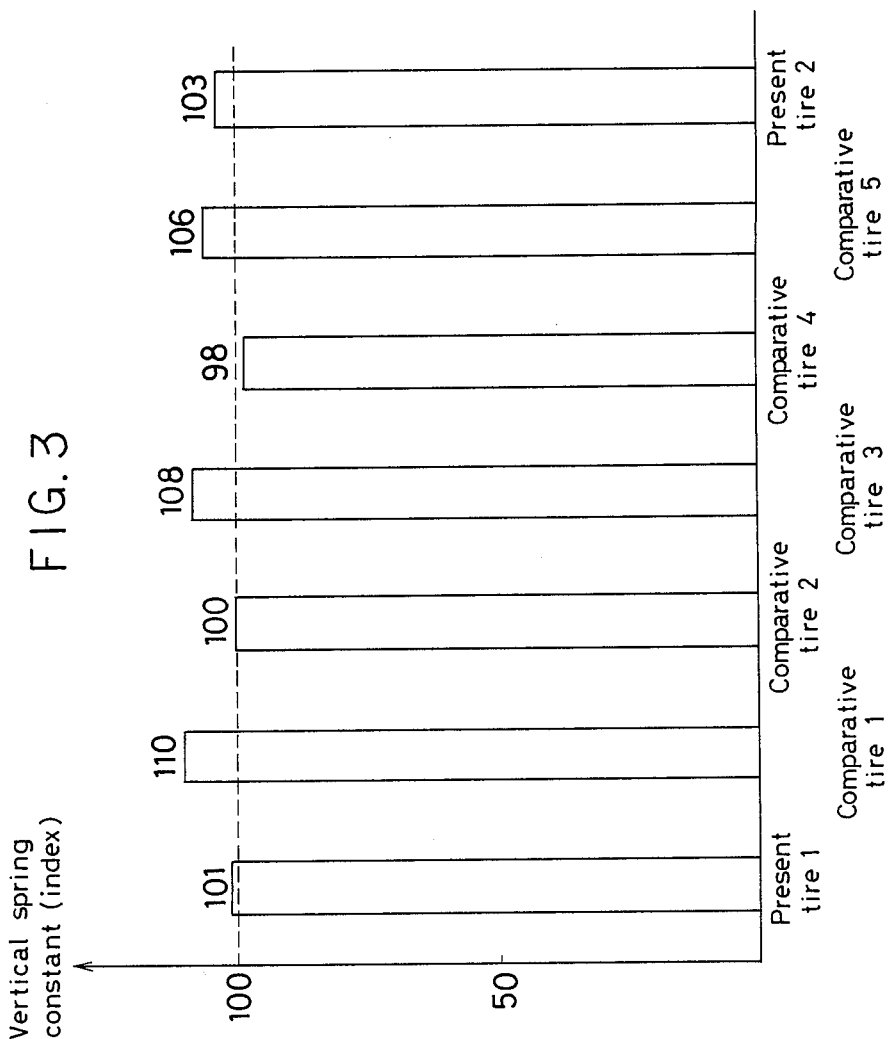
FIG. 3 is a graph illustrating vertical spring constants of various tires.
Figure 4:
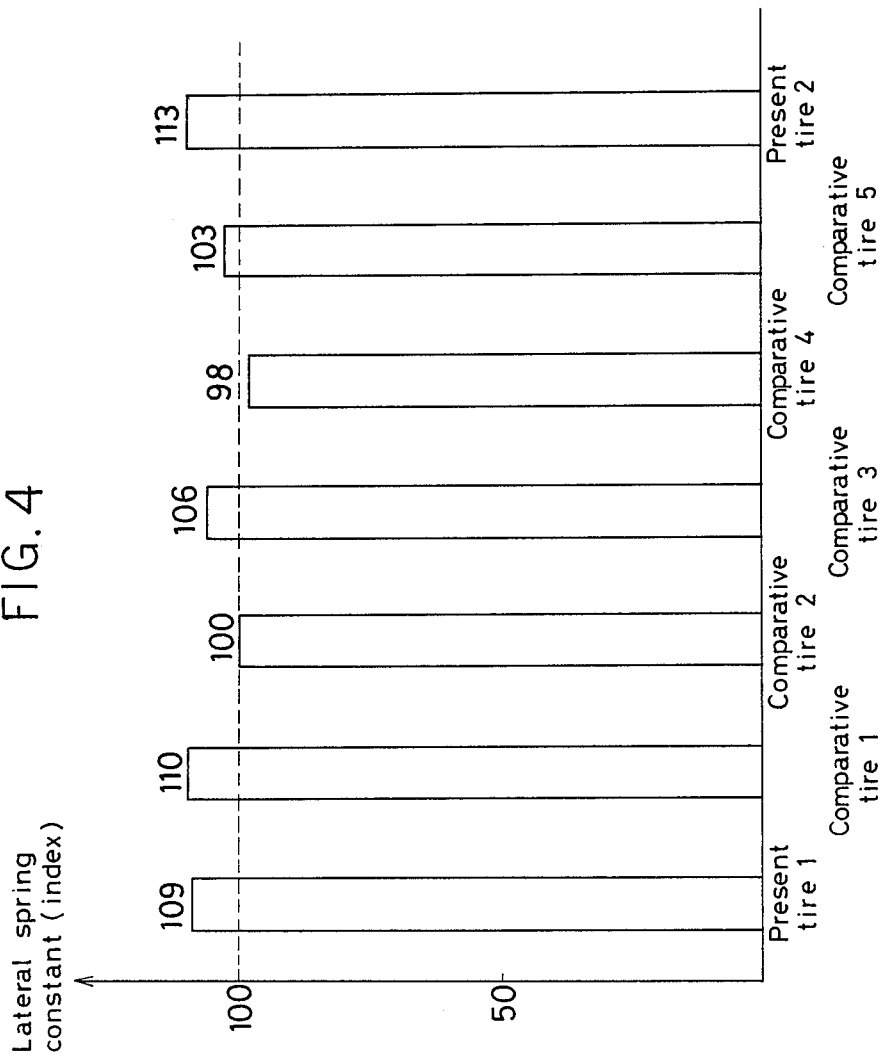
FIG. 4 is a graph illustrating lateral spring constants of various tires.

The results of the determination of the vertical spring constant are shown in FIG. 3, and the results of the determination of the lateral spring constant are shown in FIG. 4. These results were expressed in terms of ratios taking the value obtained on the Comparative Tire 2 as 100. The smaller the value of the vertical spring constant, the better the performance. On the other hand, the larger the value of the lateral spring constant, the better the performance. As can be seen from FIGS. 3 and 4, the tires of the present invention, Tires 1 and 2, are higher in the ratio of the vertical spring constant to the lateral spring constant than those of Comparative Tires 1 to 5.

DETERMINATION OF CLEAT IMPACT FORCE

Rim: 6JJ×14
Inflation pressure: 2.0 kg/cm$^2$
Load: 350 kg

The magnitude of a component with a frequency of 50 Hz or less of the tangential impact force was used as a measure of the evaluation for the riding comfort.

In this industry, the magnitude of a component with a frequency of 50 Hz or less of the tangential impact force is generally used as a measure of the evaluation for the riding comfort. The results are shown in FIG. 5.

Figure 5:
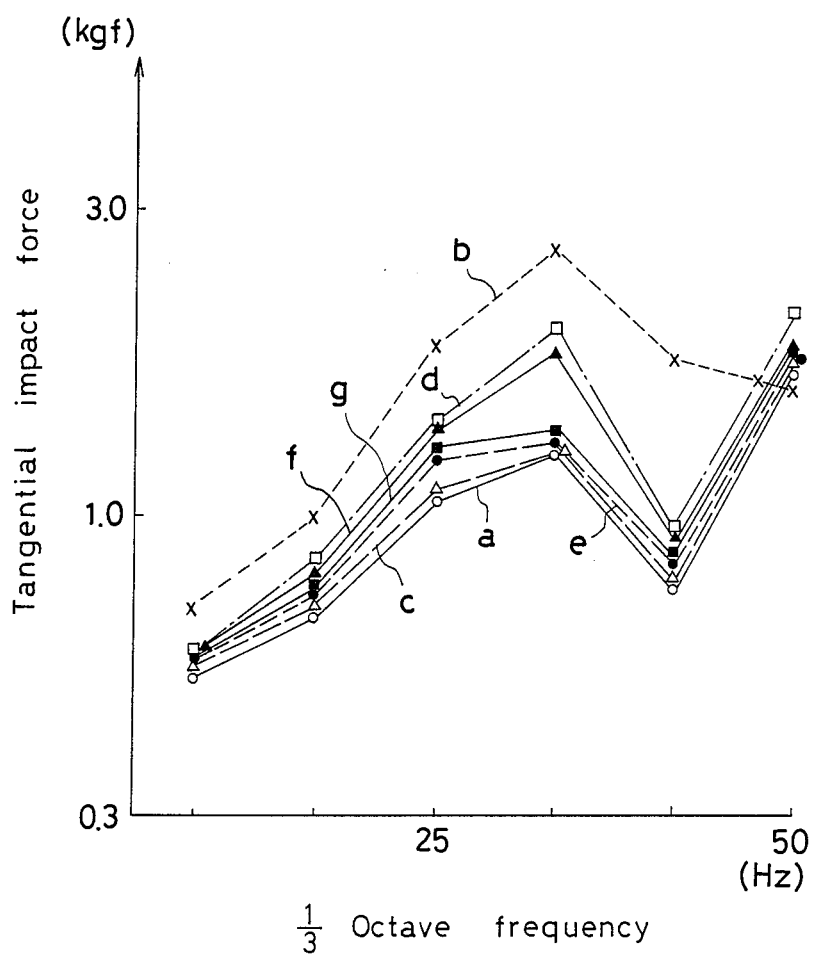
FIG. 5 is a graph showing the relationship between the frequency of various tires and the tangential cleat impact force.

In FIG. 5, the reference characters a, b, c, d, e, f, and g designate the data on Tire 1 of the present invention, Comparative Tire 1, Comparative Tire 2, Comparative Tire 3, Comparative Tire 4, Comparative Tire 5 and Tire 2 of the present invention, respectively. The test results are in agreement with the order of the magnitude of the vertical spring constants. As can be seen from FIG. 5, Tires 1 and 2 of the present invention are slightly inferior in the tangential impact force to Comparative Tires 2 and 4 and superior to Comparative Tires 1, 3 and 5.

EVALUATION OF DRIVING STABILITY

The tires were mounted on rims of 6JJ×14. The inflation pressure was set at 1.8 kg/cm$^2$. The tires were mounted on four wheels of a passenger car, and a feeling test on the driving stability was made on an paved asphalt circuit.

The test was conducted with respect to the lane change and slalom. As a result, it was found that the evaluation of the tires was Tire 2 of the present invention≧Tire 1 of the present invention≧Comparative Tire 1>Comparative Tire 3>Comparative Tire 5>Comparative Tire 4=Comparative Tire 2. As can be seen from the test results, it is apparent that Tires 1 and 2 of the present invention are excellent in driving stability.

As is apparent from the foregoing description, the present invention enables the driving stability to be sufficiently improved without sacrificing the riding comfort.

We claim:

1. A radial tire for passenger cars having a pair of bead portions, a carcass layer connecting said bead portions, and a tread portion, wherein an end portion of the carcass layer is folded back about a bead wire from the inside of the tire towards the outside of the tire, wherein the turnup portion of said carcass layer encloses a lower bead filler of hard rubber and is provided along the body of said carcass layer which has not been folded back, and an upper bead filler having a JIS hardness of 75 to 95 is provided axially outside said turnup portion, and sandwiched, on both of its inside and outside between separate textile cord layers, each textile cord layer having respectively a cord angle of 45° or less to the circumferential direction of the tire, and having the corresponding radially inner and outer end portions of said separate textile cord layers in contact.

2. A radial tire for passenger cars according to claim 1, wherein the cord angle of said textile cord layer is 10° to 40°.

3. A radial tire for passenger cars according to claim 1, wherein said textile cord layer is made of nylon fiber cord, polyester fiber cord, rayon fiber cord or aromatic polyamide fiber cord.

4. A radial tire for passenger cars according to claim 1, wherein at least one of said textile cord layers comprises two adherent layers.

* * * * *